M. D. SMITH.
Seeder and Cultivator.
No. 78,146.
Patented May 19, 1868.
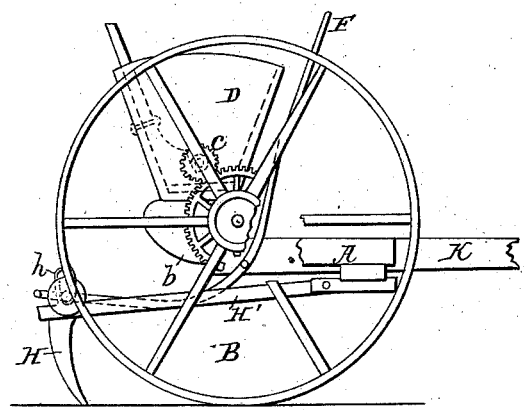
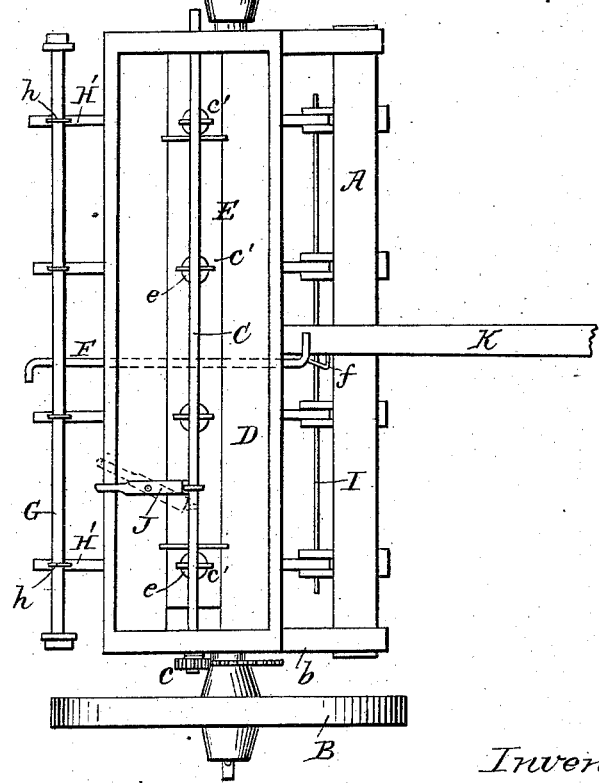

United States Patent Office.

MATTHEW D. SMITH, OF INDEPENDENCE, IOWA.

Letters Patent No. 78,146, dated May 19, 1868.

---

IMPROVEMENT IN SEEDER AND CULTIVATOR.

---

*The Schedule referred to in these Letters Patent and making part of the same.*

---

TO ALL WHOM IT MAY CONCERN:

Be it known that I, MATTHEW D. SMITH, of Independence, in the county of Buchanan, and State of Iowa, have invented certain new and useful Improvements in Seeder and Cultivator combined; and I do hereby declare that the following is a full, clear, and exact description thereof, reference being had to the accompanying drawings, and to the letters of reference marked thereon, which form a part of this specification, in which—

Figure 1 represents a plan or top view of my improved seeder and cultivator, and Figure 2 a side view of the same.

The nature of my invention consists—

First, in providing the seed-hopper with a slide and pivoted lever, so arranged that by one movement of the lever the openings in the hopper through which the seed has egress are uncovered, and the distributing-rod thrown into gear with the driving-wheel at the same time.

Second, in raising and lowering the shovels by a lever pivoted to the frame, in such manner as to be operated either from the front or rear of the machine.

In the accompanying drawings, A represents the frame of the cultivator, and B B' the wheels. A gear, b, is secured upon the wheel B, which engages a pinion, c, upon the distributing-rod C. This rod rotates in the seed-hopper D, and is provided with agitators, c'. A slide, E, having openings, e, in it, rests upon the bottom of the seed-hopper, in which openings similar in size and position are made. A lever, J, is pivoted to the hopper, and suitably connected to the rod C and slide E, for the purpose of giving them longitudinal motion therein, the rod and slide being placed in such relation to each other that the agitator c' will always be immediately above the openings e in the slide.

When the parts are in the position shown by the drawings, the wheels b and c are in gear, and the openings e in the slide coincide with those in the bottom of the hopper, allowing free egress to the seed. By moving the lever J to the position shown by the dotted lines, the pinion c is thrown out of gear with b, and the slide closes the openings in the hopper.

The shovels H are connected to arms H', which are pivoted at their front ends to a rod, I, attached to the frame, and connected near their rear ends by loops, h, to a rod, G. A lever, F, pivoted to the tongue K, in advance of the hopper, is connected to the rod G in such manner that the latter, and the shovel-arms in connection with it, can be raised or lowered by moving the lever F by either of its ends. The rod G is free to oscillate upon the lever F in a direction transverse to the movement of the machine, so as to adapt the shovels to inequalities or obstructions in the ground. A catch, f, holds the lever when the shovels are raised.

The cultivator being drawn along by the tongue K, the distributing-rod C is revolved by means of the gears b and c. The agitators c' on the rod distribute the seed to the openings e' and the openings immediately beneath them, through which it passes to the ground, and is covered up by the shovels H. By moving the lever J to the position shown by the dotted lines, the rod C and slide E are drawn towards the wheel B, throwing the pinion c out of gear with b, and closing the openings in the hopper. The throwing of the distributing-rod into and out of gear, and the opening and closing of the apertures in the hopper, are thus simultaneously performed by proper movements of the lever J.

The shovels H are raised or lowered by moving the lever F, which it will be seen can be done from either end thereof, enabling the driver to operate it either while riding on the machine or walking behind it.

What I claim as new, and desire to secure by Letters Patent, is—

1. The combination of the pivoted lever J, distributing-rod C, and slide E, when arranged and operating as and for the purpose set forth.

2. The combination of the lever F with the rod G and shovel-arms H', substantially as described.

In testimony that I claim the foregoing as my own, I affix my signature in presence of two witnesses.

MATTHEW D. SMITH.

Witnesses:
JOHN A. DAVIS,
ADELBERT BROWN.